US011223830B2

(12) United States Patent
Poirier et al.

(10) Patent No.: US 11,223,830 B2
(45) Date of Patent: Jan. 11, 2022

(54) METHOD AND APPARATUS FOR ADAPTIVE ILLUMINATION COMPENSATION IN VIDEO ENCODING AND DECODING

(71) Applicant: InterDigital VC Holdings, Inc., Wilmington, DE (US)

(72) Inventors: Tangi Poirier, Cesson-Sevigne (FR); Fabrice Leleannec, Cesson-Sevigne (FR); Franck Galpin, Cesson-Sevigne (FR); Ya Chen, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/760,890

(22) PCT Filed: Jan. 22, 2019

(86) PCT No.: PCT/US2019/014471
§ 371 (c)(1),
(2) Date: Apr. 30, 2020

(87) PCT Pub. No.: WO2019/147541
PCT Pub. Date: Aug. 1, 2019

(65) Prior Publication Data
US 2021/0195204 A1    Jun. 24, 2021

(30) Foreign Application Priority Data
Jan. 26, 2018  (EP) ................................ 18305072

(51) Int. Cl.
*H04N 19/137*     (2014.01)
*H04N 19/105*     (2014.01)
(Continued)

(52) U.S. Cl.
CPC ......... *H04N 19/137* (2014.11); *H04N 19/105* (2014.11); *H04N 19/176* (2014.11); *H04N 19/46* (2014.11)

(58) Field of Classification Search
None
See application file for complete search history.

(56) References Cited

U.S. PATENT DOCUMENTS 9,848,201 B2    12/2017  Jia et al.
10,887,597 B2 *  1/2021  Liu ....................... H04N 19/577
(Continued)

OTHER PUBLICATIONS

Chen et al.,"Algorithm Description of Joint Exploration Test Model 7 (JEM 7)", Joint Video Exploration Team (JVET), of ITU-T SG 16 WP3 and ISO/IEC JTC 1/SC 29/WG 11, JVET-G1001-v1, 7th Meeting: Torino, IT, Jul. 13-21, 2017.

(Continued)

*Primary Examiner* — Chikaodili E Anyikire
(74) *Attorney, Agent, or Firm* — Xiaoan Lu

(57) ABSTRACT

Different implementations are described for determining one or more illumination compensation parameters for a current block being encoded by a video encoder or decoded by a video decoder. A plurality of motion vectors for a current block being encoded in a picture are determined. One or more illumination compensation parameters for each of the plurality of motion vectors are determined and encoded or decoded. The current block is then encoded or decoded using the plurality of motion vectors and the one or more illumination compensation parameters for each of the plurality of motion vectors. In one embodiment, a flag is used to signal the use or not of the illumination compensation. In another embodiment, the illumination compensation flag is not encoded or decoded if illumination compensation is not used.

16 Claims, 14 Drawing Sheets

(51) Int. Cl.
 *H04N 19/176* (2014.01)
 *H04N 19/46* (2014.01)

(56) References Cited

U.S. PATENT DOCUMENTS

2016/0366416 A1* 12/2016 Liu .................. H04N 19/109
2019/0246133 A1* 8/2019 Lee .................. H04N 19/119

OTHER PUBLICATIONS

Chen et al.,"3D-AHG8: Simplification on CABAC contexts for IC and ARP Flags", 7. JCT-3V Meeting; The Joint Collaborative Team on 3D Video Coding Extension Development of ISO/IEC JTC1/SC29/WG11, JCT3V-G006, 7th Meeting San Jose, US, Jan. 11-17, 2014.

Le Leannec et al.,"Asymmetric Coding Units in QTBT", Joint Video Exploration Team (JVET), of ITU-T SG 16 WP 3 and ISO/IEC JTC 1/SC 29/WG 11, JVET-D0064, 4th Meeting: Chengdu, CN, Oct. 15-21, 2016.

Series, H. "Audiovisual and Multimedia Systems Infrastructure of audiovisual services—Coding of moving video", ITU-T Recommendation, H.265 (Oct. 2014).

* cited by examiner

METHOD AND APPARATUS FOR ADAPTIVE ILLUMINATION COMPENSATION IN VIDEO ENCODING AND DECODING

This application claims the benefit, under 35 U.S.C. § 371 of International Application No. PCT/US19/014471, filed Jan. 22, 2019, which was published on Aug. 1, 2019, which claims the benefit of European Patent Application No. EP18305072.3 filed Jan. 26, 2018.

TECHNICAL FIELD

At least one of the present embodiments generally relates to a method or an apparatus for video encoding or decoding, and more particularly, to a method or an apparatus for determining illumination compensation parameters in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to at least one embodiment, a method for encoding video data is presented, comprising: determining a plurality of motion vectors for a current block being coded in a picture; determining one or more illumination compensation parameters for each of the plurality of motion vectors; and encoding said current block using the plurality of motion vectors and the one or more illumination compensation parameters for each of said plurality of motion vectors.

According to another embodiment, a method for decoding video data is presented, comprising: determining a plurality of motion vectors for a current block being decoded in a picture; determining one or more illumination compensation parameters for each of the plurality of motion vectors; and decoding said current block using the plurality of motion vectors and the one or more illumination compensation parameters for each of said plurality of motion vectors.

According to another embodiment, an apparatus for encoding video data is presented, comprising: means for determining a plurality of motion vectors for a current block being coded in a picture; means for determining one or more illumination compensation parameters for each of the plurality of motion vectors; and means for encoding said current block using the plurality of motion vectors and the one or more illumination compensation parameters for each of said plurality of motion vectors.

According to another embodiment, an apparatus for decoding video data is presented, comprising: means for determining a plurality of motion vectors for a current block being decoded in a picture; means for determining one or more illumination compensation parameters for each of the plurality of motion vectors; and means for decoding said current block using the plurality of motion vectors and the one or more illumination compensation parameters for each of said plurality of motion vectors.

According to another embodiment, an apparatus for encoding video data is presented, comprising at least a memory and one or more processors, wherein said one or more processors are configured to: determine a plurality of motion vectors for a current block being coded in a picture; determine one or more illumination compensation parameters for each of the plurality of motion vectors; and encode said current block using the plurality of motion vectors and the one or more illumination compensation parameters for each of said plurality of motion vectors.

According to another embodiment, an apparatus for decoding video data is provided, comprising at least a memory and one or more processors, wherein said one or more processors are configured to: determine a plurality of motion vectors for a current block being decoded in a picture; determine one or more illumination compensation parameters for each of the plurality of motion vectors; and decode said current block using the plurality of motion vectors and the one or more illumination compensation parameters for each of said plurality of motion vectors.

According to another embodiment, a bitstream is formatted to include a plurality of motion vectors encoded for a current block being coded in a picture; and one or more illumination compensation parameters encoded for each of said plurality of motion vectors, wherein said current block is encoded using said plurality of motion vectors and said one or more illumination compensation parameters for each of said plurality of motion vectors.

According to another embodiment, an illumination compensation flag, indicating use of the one or more illumination compensation parameters for encoding or decoding the current block, is provided for each of said plurality of motion vectors. The illumination compensation flag may be predicted from illumination compensation parameters, such as the slope parameter and intercept parameter.

According to another embodiment, a first illumination compensation flag corresponding to a first motion vector of the plurality of motion vectors can be encoded or decoded based on a second illumination compensation flag corresponding to a second motion vector of the plurality of motion vectors. The first illumination compensation flag can be entropy encoded or decoded using a different context than the second illumination compensation flag.

According to another embodiment, the illumination compensation flag is not coded or decoded if illumination compensation is not used.

According to another embodiment, the plurality of motion vectors are determined from one or more reference pictures.

According to another embodiment, the one or more reference pictures are indexed in one or more reference picture lists.

According to another embodiment, the current block is a bi-predictive prediction block, wherein said plurality of motion vectors are one motion vector pointing to a first reference picture block and another motion vector pointing to a second reference picture block.

According to another embodiment, the current block is inter-coded.

According to another embodiment, the current block is coded in AMVP mode.

According to another embodiment, the current block is coded in merge mode.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and an apparatus for transmitting the bitstream generated according to the methods described above. The present embodiments also provide a computer program product including instructions for performing any of the methods described.

DETAILED DESCRIPTION

Figure 1:
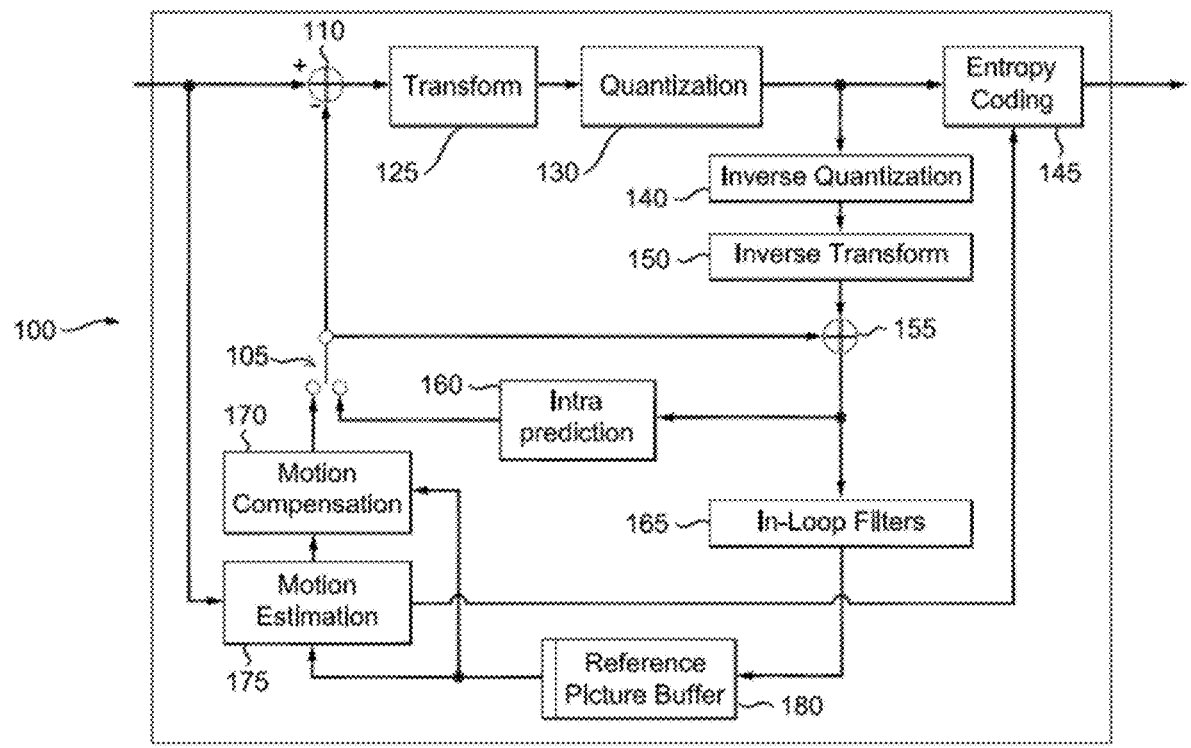
FIG. 1 illustrates a block diagram of an embodiment of a video encoder.

FIG. 1 illustrates an exemplary video encoder 100, such as a High Efficiency Video Coding (HEVC) encoder. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC.

In the present application, the terms "reconstructed" and "decoded" may be used interchangeably, the terms "encoded" or "coded" may be used interchangeably, and the terms "picture" and "frame" may be used interchangeably. Usually, but not necessarily, the term "reconstructed" is used at the encoder side while "decoded" is used at the decoder side.

In HEVC, to encode a video sequence with one or more pictures, a picture is partitioned into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figure 2A:
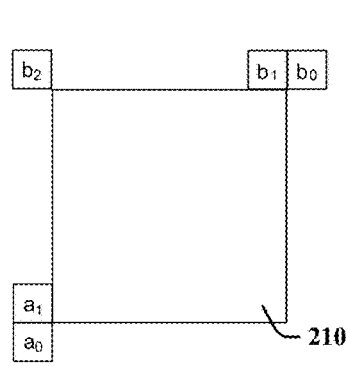
FIG. 2A is a pictorial example depicting the positions of five spatial candidates.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1, b_1, b_0, a_0, b_2$, and then the redundancy in candidates is removed.

The motion vector of the collocated location in a reference picture can be used for derivation of a temporal candidate. The applicable reference picture is selected on a slice basis and indicated in the slice header, and the reference index for the temporal candidate is set to $i_{ref}=0$. If the POC distance (td) between the picture of the collocated PU and the reference picture from which the collocated PU is predicted from, is the same as the distance (tb) between the current picture and the reference picture containing the collocated PU, the collocated motion vector $mv_{col}$ can be directly used as the temporal candidate. Otherwise, a scaled motion vector, $tb/td*mv_{col}$, is used as the temporal candidate. Depending on where the current PU is located, the collocated PU is determined by the sample location at the bottom-right or at the center of the current PU.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

Figure 2B:
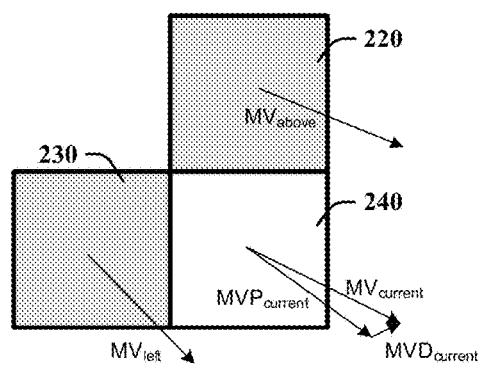
FIG. 2B is a pictorial example depicting motion vector representation using AMVP.

FIG. 2B illustrates an exemplary motion vector representation using AMVP. For a current block 240 to be encoded, a motion vector ($MV_{current}$) can be obtained through motion estimation. Using the motion vector ($MV_{left}$) from a left block 230 and the motion vector ($MV_{above}$) from the above block 220, a motion vector predictor can be chosen from $MV_{left}$ and $MV_{above}$ as $MVP_{current}$. A motion vector difference then can be calculated as $MVD_{current}=MV_{current}-MVP_{current}$.

Motion compensation prediction can be performed using one or two reference pictures for prediction. In P slices, only a single prediction reference can be used for Inter prediction, enabling uni-prediction for a prediction block. In B slices, two reference picture lists (i.e., list 0, list 1) are available, and uni-prediction or bi-prediction can be used. In bi-prediction, one reference picture from each of the reference picture lists is used.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
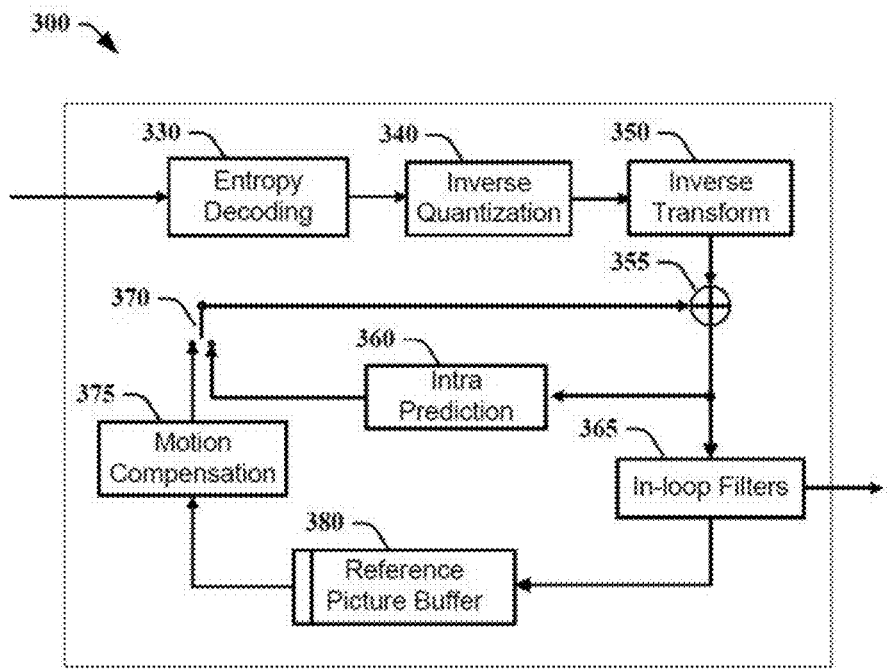
FIG. 3 illustrates a block diagram of an embodiment of a video decoder.

FIG. 3 illustrates a block diagram of an exemplary video decoder 300, such as an HEVC decoder. In the exemplary decoder 300, a bitstream is decoded by the decoder elements as described below. Video decoder 300 generally performs a decoding pass reciprocal to the encoding pass as described in FIG. 1, which performs video decoding as part of encoding video data. FIG. 3 may also illustrate a decoder in which improvements are made to the HEVC standard or a decoder employing technologies similar to HEVC.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

A Frame Rate Up-Conversion (FRUC) mode or derivation, based on frame rate up-conversion techniques, is developed in the reference software JEM (Joint Exploration Model) by the Joint Video Exploration Team (JVET). With the FRUC mode, motion information of a block is derived at the decoder side without explicit syntax for MVP information. The FRUC process is completely symmetric, i.e., the same motion derivation operations are performed, at the encoder and the decoder.

In JEM, the QTBT (Quadtree plus Binary Tree) structure removes the concept of multiple partition types in HEVC, i.e., removes the separation of CU, PU and TU concepts. A Coding Tree Unit (CTU) is firstly partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

Figure 4:
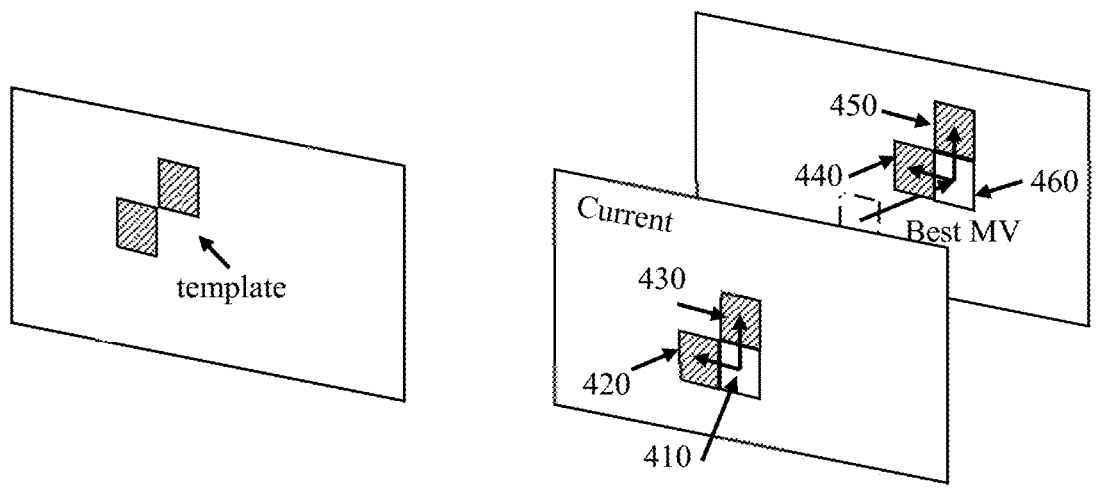
FIG. 4 illustrates using FRUC to derive motion information for a current block.

FIG. 4 illustrates using FRUC to derive motion information for a current block 410. The current block may be in the "merge" or "AMVP" mode. Top and left neighboring blocks of the current block are used as a template. The motion information can be derived by locating the best match between the template (420, 430) of the current block and the template (440, 450) of a block in the reference picture by locating the block (460) with the smallest matching cost, for example, with the smallest SAD (Sum of Absolute Differences) between the templates. Other cost measures than SAD can also be used for calculating the matching cost. In particular, the motion vector can be obtained as the displacement between a collocated block of the current block and the best matching block.

Figure 5:
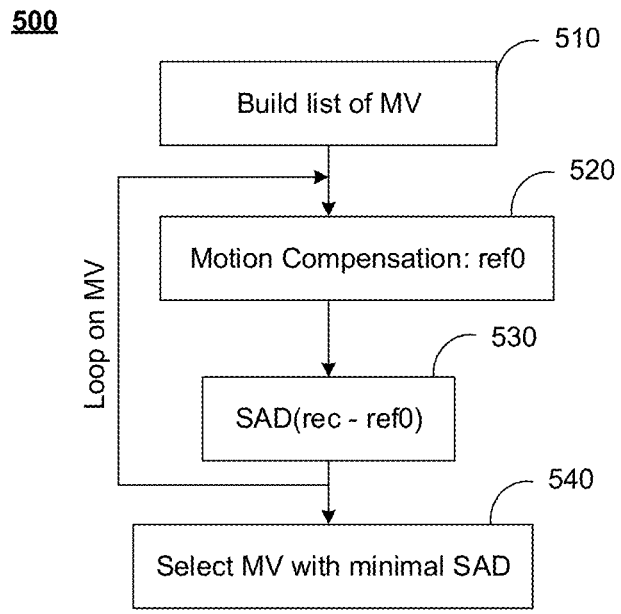
FIG. 5 illustrates an exemplary process for performing motion derivation.

FIG. 5 illustrates an exemplary process 500 of selecting a motion vector in the FRUC mode. At step 510, a list of MV candidates is built. At steps 520 to 540, the MV (best_MV at 540) is selected from the list of MV candidates, in order to minimize the Sum of Absolute Difference (SAD) (530) between the templates (ref0 and rec in 530) for the motion compensated reference block and the current block.

A recent addition to high compression technology includes using a motion model based on affine modeling. In particular, affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom). An affine flag is used to signal the use of affine modeling in the coding and decoding.

Figure 6:
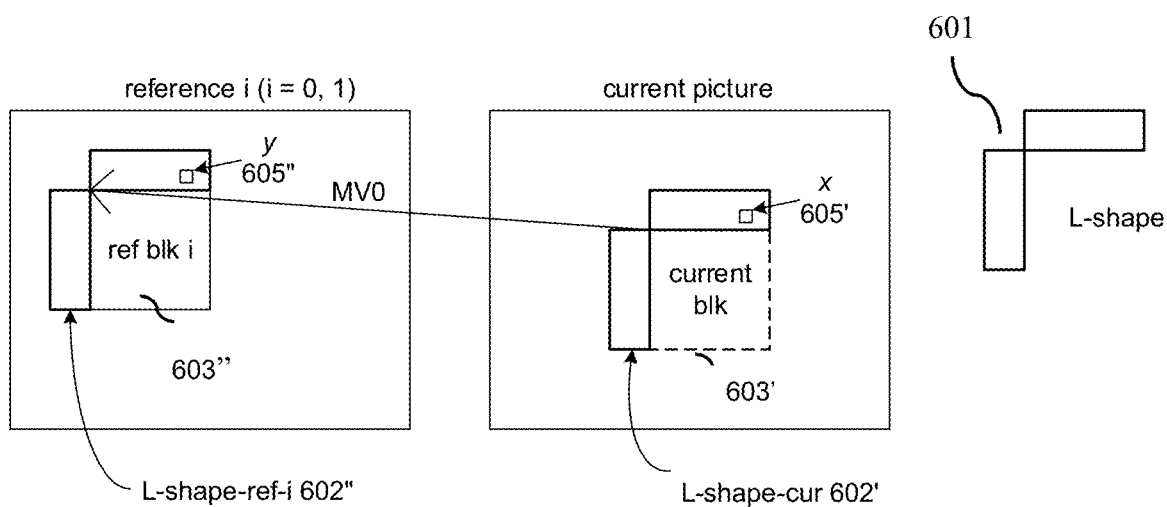
FIG. 6 illustrates conceptually the derivation of illumination compensation (IC) parameters using an L-shape template.

Other recent additions to the video compression technology, such as those described in Algorithm Description of Joint Exploration Test Model 6 (JEM 6, Document: JVET-F1001-v3) include using illumination compensation (IC) parameters to compensate variations in illumination (e.g., brightness) between the current block being encoded or decoded and at least one prediction block. In particular, an L-shape template is used to select neighboring samples for calculating the IC parameters in an inter coding mode as shown in FIG. 6. The IC parameters are estimated by comparing the reconstructed neighboring samples (i.e., samples in L-shape-cur region 602' of a current block 603') with the neighboring samples (samples in L-shape-ref-i region, 602") of the reference-i block (i=0 or 1) 603". Note that in order to reduce the computational complexity, the reference-i block here may not be exactly the prediction block, rather, the reference-i block can be based on an integer version of the motion vector (i.e., full-pel precision) not using motion compensation interpolation filters. The IC parameters minimize the difference between the samples in the L-shape-cur 602' and the samples in the L-shape-ref-i 602" adjusted with the IC parameters. Without loss of generality, the reference-i block may also be referred to as the prediction block.

That is, in inter prediction encoding or decoding, the current block 603' uses motion information (e.g., a motion vector $MV_{cur}$ and a reference picture index i identifying one reference picture in, for example, a decoded picture buffer) to build the prediction block using the motion compensation (MC) process. Further, the prediction block is adjusted by the IC parameters. Given a prediction block obtained using the ith reference picture (ref-i), the IC parameters are estimated by comparing the reconstructed neighboring samples in L-shape-cur 602' with the neighboring samples in L-shape-ref-i 602" of the ref-i block (i=0 or 1) as depicted in FIG. 6.

The IC parameters may be estimated by minimizing the mean square error/difference (MSE) between the samples in the L-shape-cur 602' and the samples of the L-shape-ref-i 602" adjusted with IC parameters. Typically, the IC model is linear, e.g., $$IC(y)=ay+b, \quad (1)$$

where a is a slope parameter and b is an intercept parameter. The IC parameters ($a_i$, $b_i$) may then be obtained as shown below:

$$(a_i, b_i) = \underset{(a,b)}{\mathrm{argmin}}\left(\sum_{\substack{x \in L\text{-}shape\text{-}cur, \\ y \in L\text{-}shape\text{-}ref\text{-}i}} (x-ay-b)^2\right) \quad (2)$$

where x is a reconstructed sample in the L-shape template in the current picture, y is a sample in the L-shape template in the reference picture, which can be obtained via motion compensation with $MV_{cur}$ or modified $MV_{cur}$ (e.g., a lower precision of $MV_{cur}$). In Eq. (2), x and y are samples situated in the same location inside the L-shape templates as illustrated in FIG. 6 (see e.g., x 605' and y 605" pair). In the case of a bi-prediction, the IC parameters ($a_0$, $b_0$) and ($a_1$, $b_1$) may be derived independently from L-shape-ref-0 and from L-shape-ref-1 respectively. In the bitstream, when IC is enabled for the current slice, picture or sequence, an indication such as, e.g., an IC flag may be encoded per block to indicate whether IC is enabled for this block or not. Therefore, in the case of a bi-predicted current coding block or unit in the existing approach, IC is either applied to both the ref-0 and the ref-1 reference samples of the current block or unit, or is not applied to both.

The present embodiments recognize certain limitations and disadvantages of the above described existing approach in the current proposed IC processing in JEM. Such limitations and disadvantages of the current proposal include, for example:

In case of a bi-predicted current block, some illumination changes in the current block may exist relative to one reference block and not for the other reference block. This situation cannot be accounted for since there is only one IC flag per the whole CU, as described above.

The IC flag may be inferred or spatially predicted from the neighboring blocks, in case the motion information associated with the current block is close to the motion information associated with at least one neighboring block available in its decoded state. Such potential correlation between a current block's IC parameters and the IC parameters of neighboring block is not fully exploited in the JEM video coding scheme.

Accordingly, the present embodiments are directed to methods and apparatus for improving IC processing associated with a block being coded or decoded. In some of the present embodiments, IC parameters associated with the CU are processed in a similar way as how other motion information (motion vector, reference picture information) for a block is processed. Thus, e.g., IC processing is integrated into the processing of the motion information of a current block being coded or decoded. That is, the motion information can include motion vector, reference picture information and motion compensation information. In the following, we denote the data field representing the motion information as a "motion field," which may be used interchangeably with the term "motion information."

In some present embodiments, IC processing is determined and/or signaled for each motion vector considered for a CU, rather than on a whole CU level. This means that an IC flag may be associated with each motion vector of a CU. As a result, several motion vectors and therefore several IC flags may be associated with a CU. In the case of a bi-predicted CU, at least two motion vectors are associated with the CU. In the case when a CU is divided into two bi-predicted Prediction Units (PUs) as in HEVC, one pair of IC flags are associated with each PU of the two PUs contained in the CU. That is, one IC flag for each of the two bi-prediction motion vectors assigned to each PU.

According to a general aspect of at least one embodiment, the present improved IC processing is applied to the AMVP mode, in which the motion information coded/decoded for a CU comprised of one or several motion fields. Each motion field includes parameters such as, e.g., a reference frame index, a motion vector, and etc. According to some of the present embodiments, the IC flag information becomes part of the motion field information of a given CU.

In the following examples, we consider that one CU corresponds to one PU and to one TU. Therefore, according to a general aspect of at least one embodiment, a motion field of a CU may comprise, for example:
  a motion vector,
  a reference picture index,
  an IC flag, indicating if IC is used or not when processing the current motion field during temporal prediction.
Note that in general, several motion fields may be associated with a CU: one motion field for each reference picture list associated with the considered CU.

One advantage of the proposed IC flag parameter being integrated into the motion field is the flexibility of being able to provide IC processing for each of the references in both the reference picture list 0 and reference picture list 1. Because the loop over IC flag is moved from the CU level to the motion estimation process, some processes such as RDOQ and coefficient coding estimation are avoided. Thus, the present codec design modification can lead to a reduced encoding/decoding time, with almost no change to the compression performance compared to the existing codec.

Figure 7:
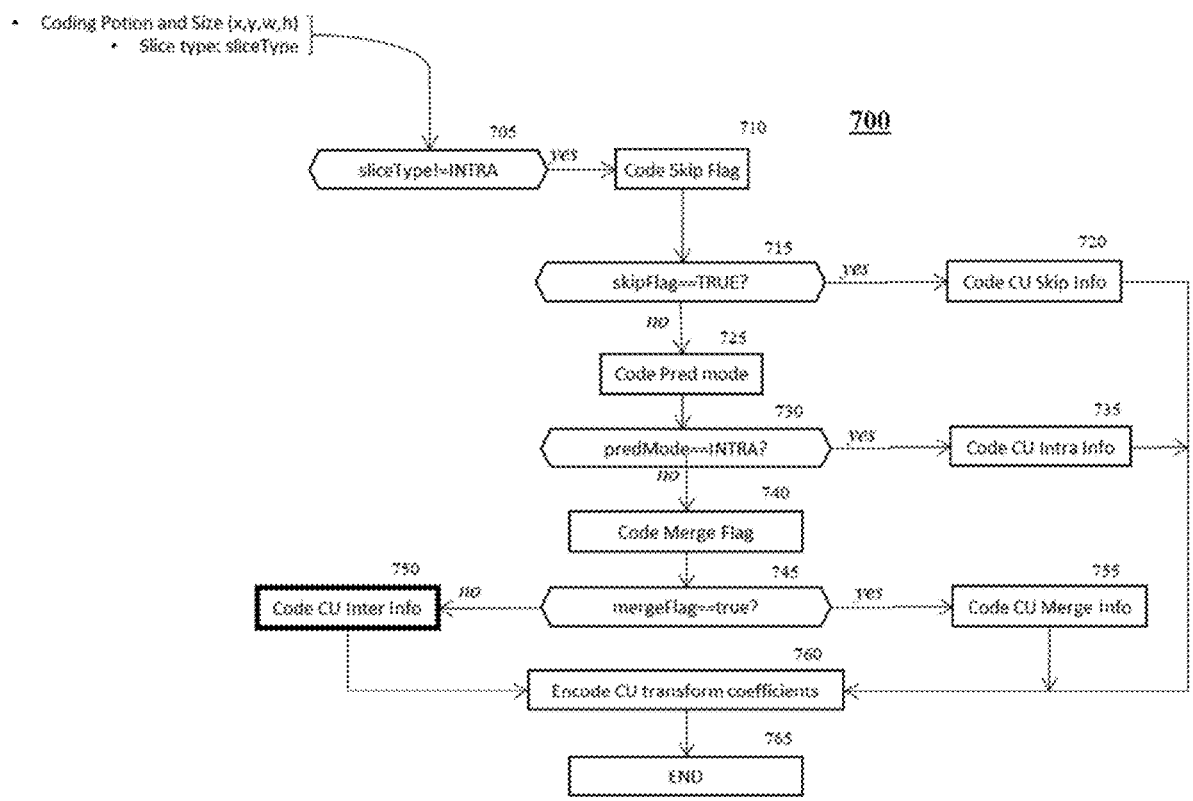
FIG. 7 illustrates an exemplary process 700 for inter-encoding of a current CU.

FIG. 7 illustrates an exemplary existing process 700 for inter-encoding of a current CU. The input to the process 700 is, e.g., coding position, size and slice type of the current block as shown in FIG. 7. At step 705, the encoder checks if the slice type is not intra (i.e., inter-coded slice instead). At step 710, the skip mode flag is coded depending on whether the skip mode is used or not. At step 715, if the skip mode flag is determined to be true, then the skip mode information for the current CU is coded at step 720. On the other hand, if the skip mode is not used as determined at step 715, then the prediction mode is coded at step 725. At steps 730 and 735, if the prediction mode is intra mode, then intra-coding information for the CU is coded. At step 740, if the prediction mode is not intra mode (i.e., inter mode instead), then the merge flag is coded accordingly. At steps 745 and 755, if the merge mode flag is coded as true, then merge information of the current CU is coded. If on the other hand, the merge mode flag is coded as not true, then at step 750, inter-coding information (e.g., inter_pred_idc, motion vector difference, motion vector predictor index) for the current CU is coded. As noted before, in the current JEM IC processing, the IC flag and the corresponding IC parameters are determined and encoded for the whole CU, and are encoded as part of the step 750 shown in FIG. 7. At step 760, transform coefficients for the current CU are determined and encoded. At step 765, process 700 ends.

Figure 8:
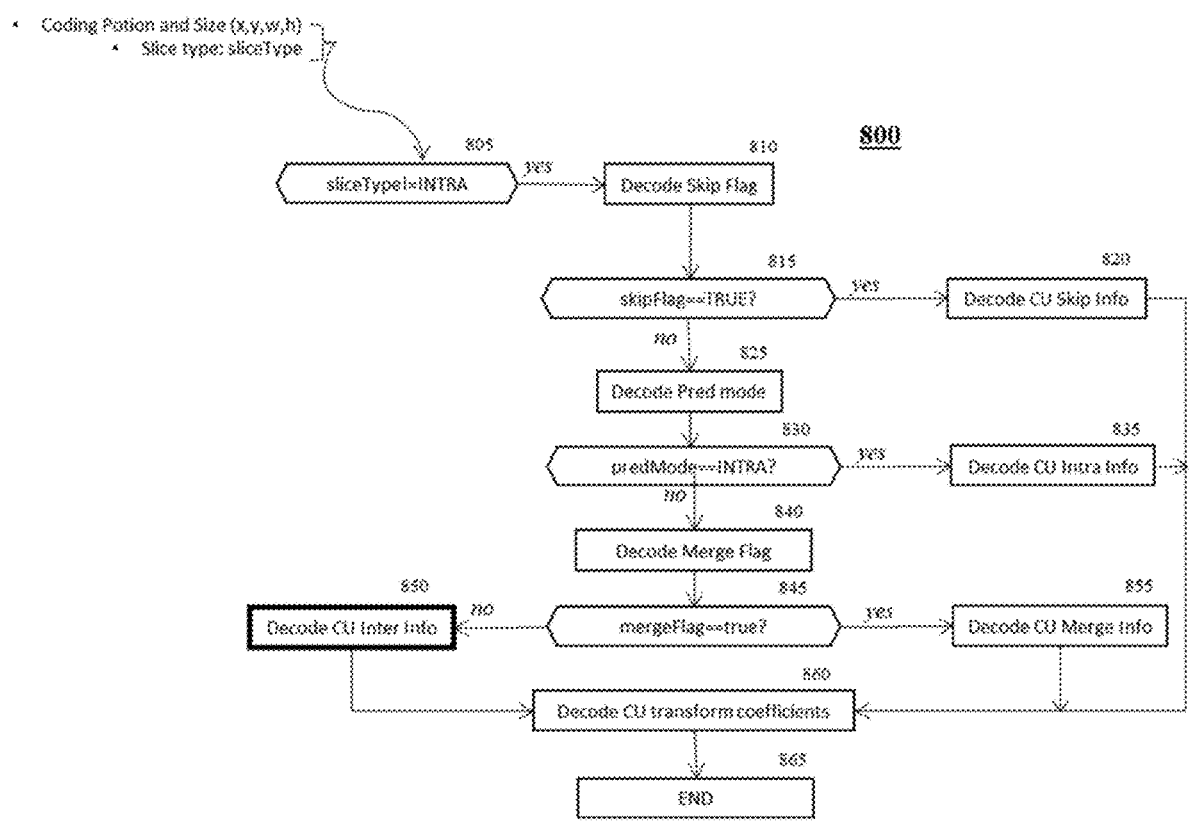
FIG. 8 illustrates an exemplary process 800 for inter-decoding of a current CU.

FIG. 8 illustrates an exemplary existing process 800 for inter-decoding of a current CU. The decoding process 800 is the corresponding decoding process of the exemplary encoding process 700 shown in FIG. 7. The input to the process 800 in FIG. 8 is, e.g., coding position, size and slice type of the current block as shown in FIG. 8. At step 805, the slice type is decoded and determined to be not intra (i.e., inter-coded slice instead). At step 810, the skip mode flag is decoded. At step 815, if the skip mode flag is determined to be true, then the skip mode information for the current CU is decoded at step 820. On the other hand, if the skip mode is not used as determined at step 815, then the prediction mode is decoded at step 825. At steps 830 and 835, if the prediction mode is intra mode, then intra-coding information for the current CU is decoded. At step 840, if the prediction mode is not intra mode (i.e., inter mode instead), then the merge flag is decoded accordingly. At steps 845 and 855, if the merge mode flag is true, then merge information of the current CU is decoded. If on the other hand, the merge mode flag is not true, then at step 850, inter-coding information for the current CU is decoded. As noted before, in the JEM IC processing method, the IC flag and the corresponding IC parameters are decoded per the whole CU only, and are decoded as part of the step 850 shown in FIG. 8. At step 860, transform coefficients for the current CU are decoded. At step 865, process 800 ends.

Figure 9:
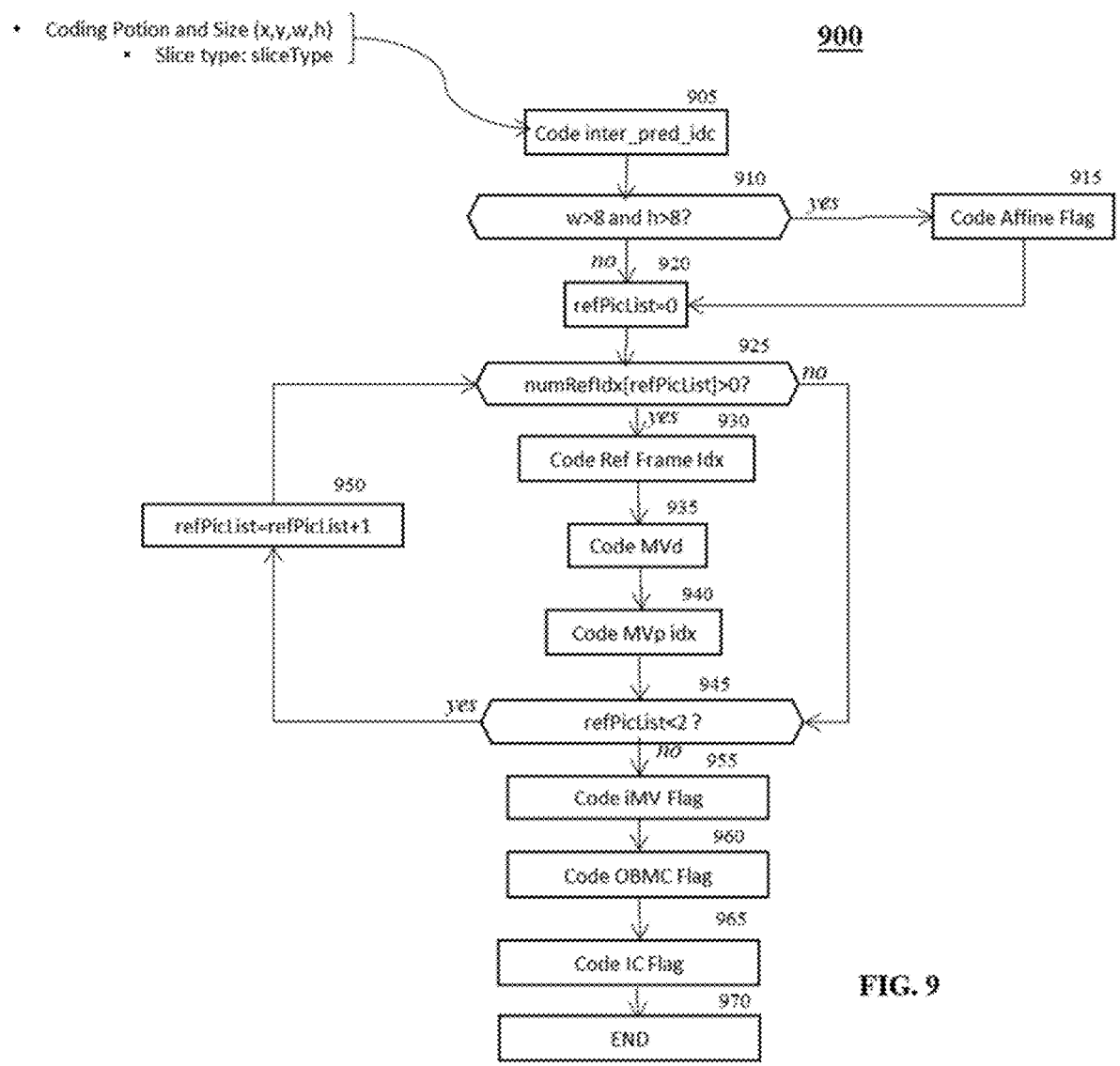
FIG. 9 illustrates an exemplary encoding process for AMVP mode inter-encoding of a current CU.

FIG. 9 illustrates an exemplary existing encoding process 900 for AMVP mode inter-encoding of a current CU. The input to the process 900 is, e.g., coding position, size and slice type of the current block as shown in FIG. 9. At step 905, an inter direction parameter, e.g., the inter_pred_idc parameter provided in the HEVC standard is determined and coded for the current block. The inter direction parameter specifies whether list 0, list 1, or bi-prediction (both lists) is used for the current CU. At step 910, the size of the current block is checked to see if the numbers of pixels for both the width and the height of the current block are greater than 8. If yes, then at step 915, an affine flag is determined and coded. On the other hand, if the numbers of pixels for one or both of the width and the height of the current block are not greater than 8, then at step 920, a parameter refPicList is set to 0, corresponding to the reference picture list 0. If affine motion prediction is not used, steps 910 and 915 may be skipped.

At steps 925-950, the process 900 enters into an iterative loop for each of the reference picture lists. In this loop, a reference picture index number for each of the reference picture lists is determined and coded at step 930. At step 935, a motion vector difference (MVD) is coded. Likewise, at step 940, motion vector predictor information such as an index in the candidate list to identify a motion vector predictor (MVP) is also coded. Additional temporal prediction parameters may also be encoded. For example, at step 955, an iMv flag indicates if the current CU's motion vectors are coded with a reduced accuracy level compared to the usual ¼ pel accuracy. At step 960, the OBMC flag may be coded to indicate if the temporal prediction of the current CU includes the Overlapped Block Motion Compensation (OBMC) processing. At step 965, the IC flag indicating whether IC is used for the current CU, is determined and coded. Again, as already noted before, this existing IC processing as shown in the exemplary encoding process 900 of FIG. 9 only determines and codes the IC flag and the IC parameters once for the whole CU, even in AMVP mode. Method 900 ends at step 970.

Figure 10:
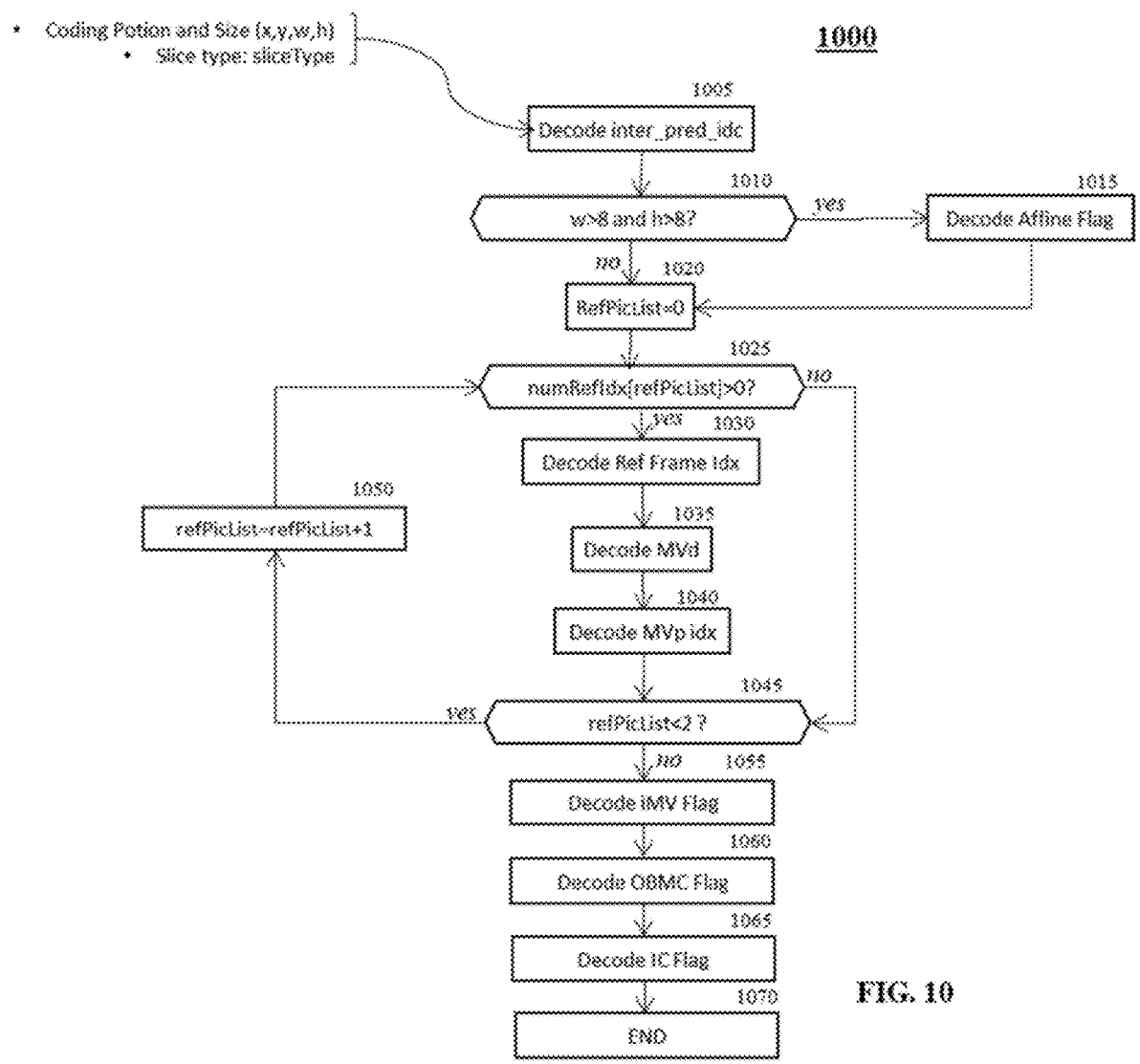
FIG. 10 illustrates an exemplary decoding process for AMVP mode inter-decoding of a current CU.

FIG. 10 illustrates an exemplary existing decoding process 1000 for AMVP mode inter-decoding of a current CU. The decoding process 1000 shown in FIG. 10 is the corresponding AMVP decoding process of the exemplary AMVP encoding process 900 shown in FIG. 9. The input to the process 1000 in FIG. 10 is, e.g., coding position, size and slice type of the current block as shown in FIG. 10. At step 1005, the inter direction parameter, e.g., the inter_pred_idc parameter is decoded for the current block. At step 1010, the size of the current block is checked to see if the numbers of pixels for both the width and the height of the current block are greater than 8. If yes, then at step 1015, an affine flag is decoded. On the other hand, if the numbers of pixels for one or both of the width and the height of the current block are not greater than 8, then at step 1020, a parameter refPicList is set to 0, corresponding to the reference picture list 0.

At steps 1025-1050 of FIG. 10, the process 1000 enters into an iterative loop for each of the reference picture lists. In this loop, a reference picture index number for each of the reference picture lists is decoded at step 1030. At step 1035, a motion vector difference (MVD) is decoded for each reference picture list. Likewise, at step 1040, motion vector predictor information such as an index in the candidate list to identify a motion vector predictor (MVP) is also decoded. Additional temporal prediction parameters may also be decoded. For example, at step 1055, an iMv flag indicating if the current CU's motion vectors are coded with a reduced accuracy level compared to the usual ¼ pel accuracy, is decoded. At step 1060, the OBMC flag indicating if the temporal prediction of the current CU includes the OBMC processing is decoded. At step 1065, the IC flag indicating whether IC is used for the current CU is decoded. Again, as already noted before, the existing IC processing as shown in the exemplary decoding process 1000 of FIG. 10 only decodes and determines the IC flag and the IC parameters once for the whole CU, even in AMVP mode.

Figure 11:
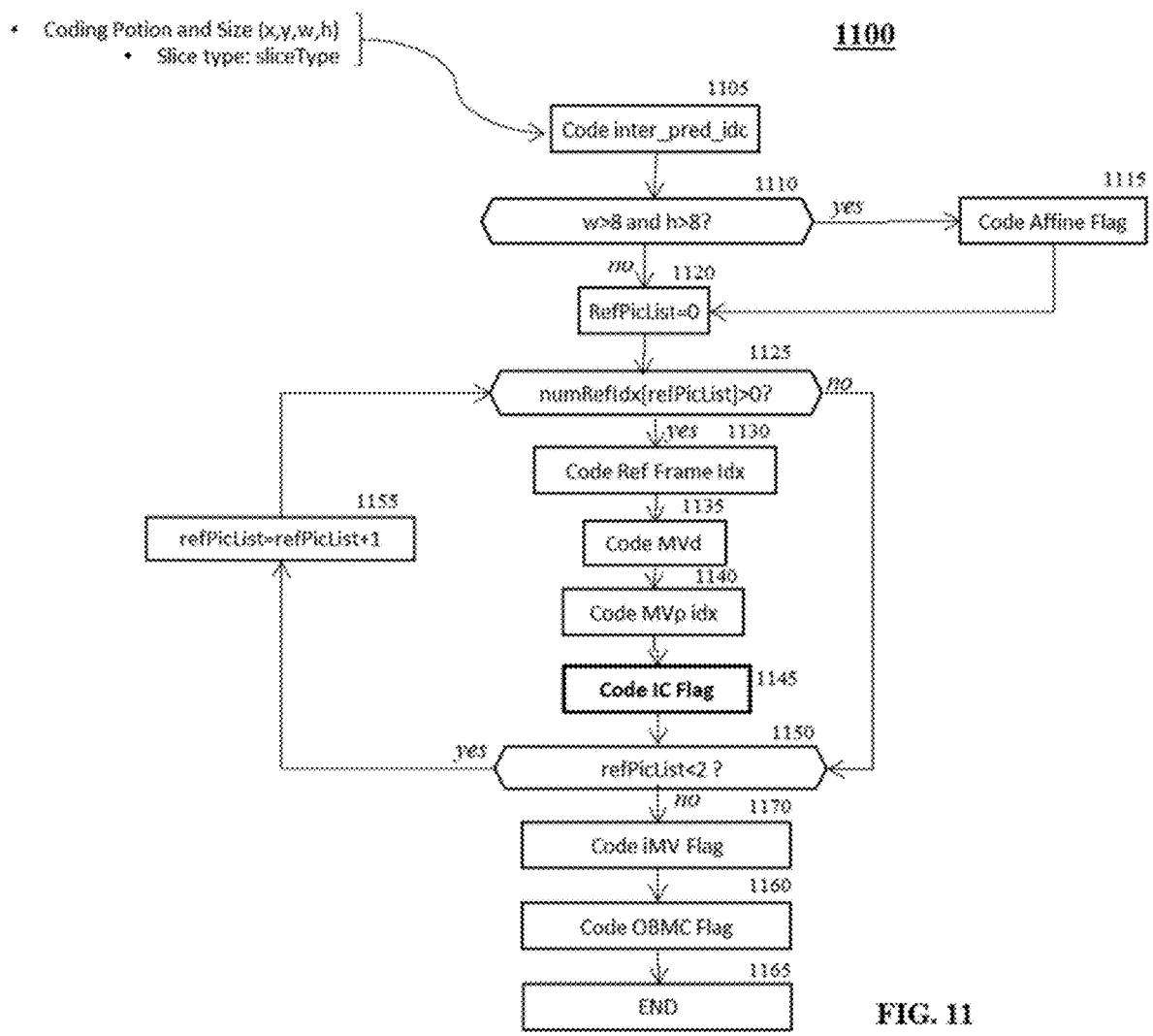
FIG. 11 illustrates an exemplary encoding process for a current CU, according to an aspect of the present embodiments.

FIG. 11 illustrates an exemplary encoding process 1100 for AMVP mode inter-encoding of a current CU according to a general aspect of at least one present embodiment. As is evident by comparison to the existing AMVP mode encoding process 900 shown in FIG. 9, the present process 1100 in FIG. 11 differs from the known process 900 in FIG. 9 in that IC information (e.g., IC flag) is now determined and coded for each of the reference picture lists inside the iterative loop composed of steps 1125 to 1155. Therefore, in the present embodiments, the IC usage information is now integrated into the motion field level. Thus, for each reference picture used to predict the current CU, the coded motion field may include the following as shown in FIG. 11:

a reference picture index, as shown at step 1130,
    a Motion Vector Difference, as shown at step 1135,
    a Motion Vector Predictor identifier index, as shown at step 1140, and
    an IC flag (and other IC parameters if explicitly encoded) indicating the use of illumination compensation, as shown at step 1145.

The other steps (1170, 1160, 1165) of the exemplary encoding process 1100 shown in FIG. 11 are essentially the same as the corresponding steps of the existing encoding process 900 in FIG. 9 already described in detail previously. Therefore, for the purpose of brevity, these corresponding steps in the encoding process 1100 in FIG. 11 will not be described again here.

Figure 12:
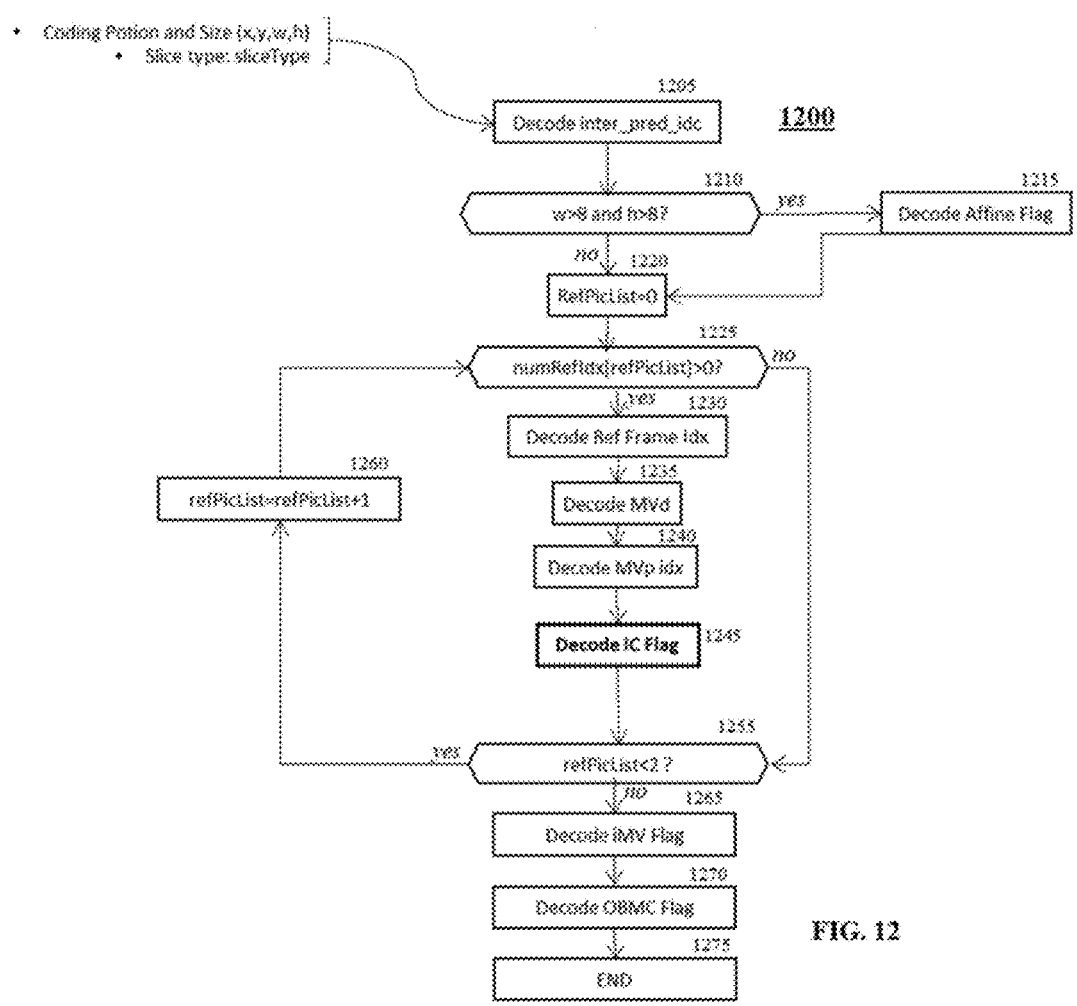
FIG. 12 illustrates an exemplary decoding process for a current CU, according to an aspect of the present embodiments.

Likewise, FIG. 12 illustrates an exemplary decoding process 1200 for AMVP mode inter-decoding of a current CU according to a general aspect of at least one present embodiment. The decoding process 1200 is the corresponding AMVP decoding process of the exemplary AMVP encoding process 1100 shown in FIG. 11. As is evident by comparison to the existing AMVP mode encoding process 1000 shown in FIG. 10, the present decoding process 1200 in FIG. 12 differs from the known decoding process 1000 in FIG. 10 in that IC information (e.g., IC flag) is now decoded for each of the reference picture lists inside the iterative loop composed of steps 1225 to 1260. Therefore, in the present embodiment, the IC usage information is now integrated into the motion field level. Thus, for each reference picture used to decode the current CU, the decoded motion data may include the following as shown in FIG. 12:

a reference picture index, as shown at step 1230,
    a Motion Vector Difference (MVD), as shown at step 1235,
    a Motion Vector Predictor (MVP) identifier index, as shown at step 1240, and
    an IC flag indicating the use of illumination compensation for each reference picture list of the current CU, as shown at step 1245.

The other steps (1265, 1270, 1275) of the present exemplary decoding process 1200 shown in FIG. 12 are essentially the same as the corresponding steps of the existing decoding process 1000 in FIG. 10 already described in detail previously. Therefore, for the purpose of brevity, these corresponding steps in the decoding process 1200 in FIG. 12 will not be described again here.

In another aspect according to the present embodiments, in addition to the modification of the coding of the IC information as explained above, further modification of the inter-encoding of a CU in AMVP mode may include a rate distortion optimization in the AMVP mode. Indeed, since there is now one IC flag assigned to each reference picture candidate for each inter CU, the IC flag information is being decided during the search for the best motion data to predict a current CU in the AMVP mode.

Figure 13:
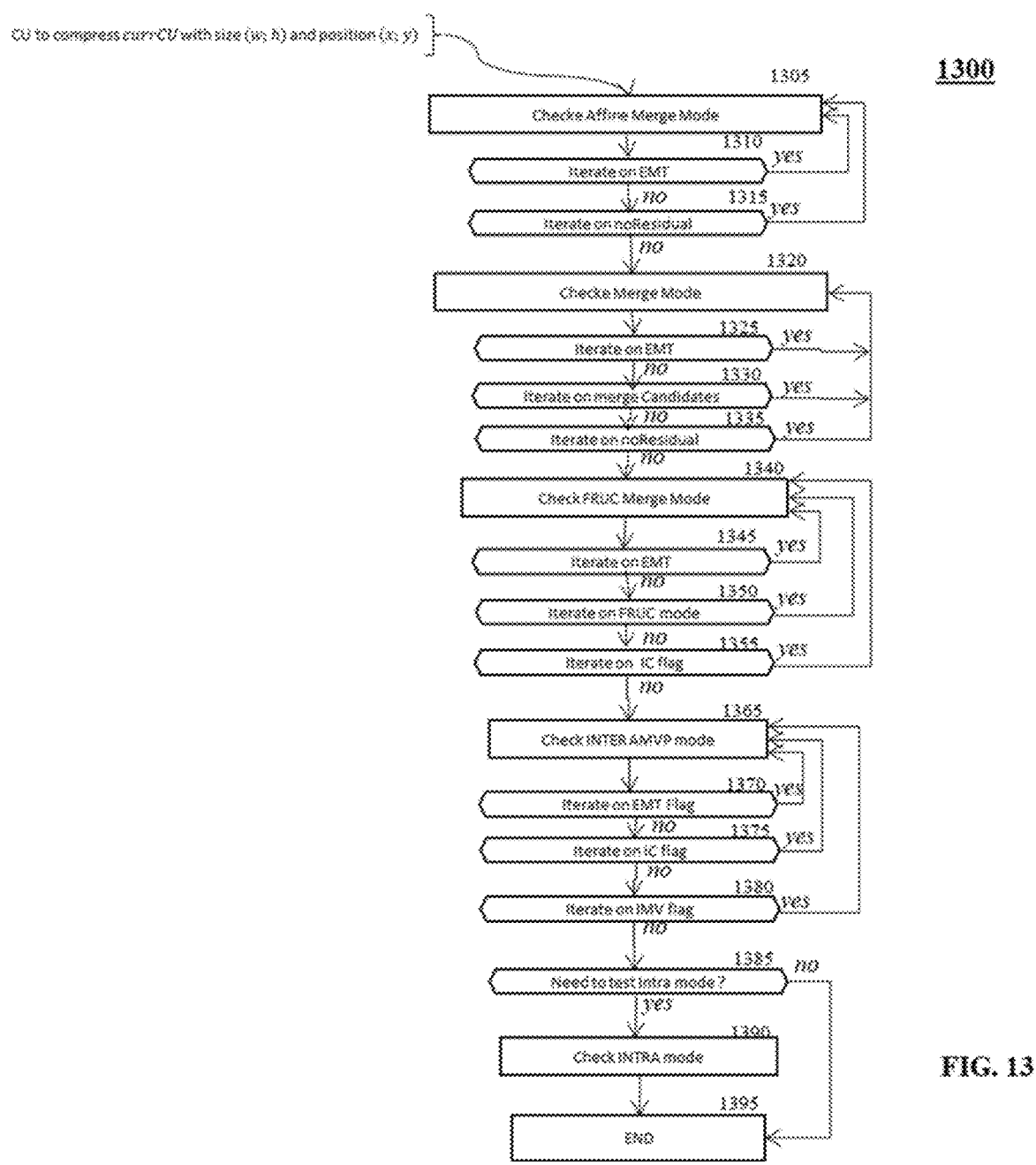
FIG. 13 illustrates an exemplary process to determine an overall rate distortion optimized choice for the coding mode for a CU.

FIG. 13 shows an exemplary existing process 1300 to determine an overall rate distortion optimized choice for the coding mode for a CU in an inter coded slice. As can be seen in the process 1300 of FIG. 13, all possible inter coded modes are first evaluated at steps 1305-1380. After that, an intra mode is evaluated at steps 1385 and 1390, if the best found inter coded mode at steps 1305-1380 does not perform sufficiently well in the coding of the considered CU in terms of the rate distortion. At steps 1305-1380, the tested inter coded modes include affine merge mode (steps 1305-1315), merge mode (steps 1320-1335), FRUC merge mode (steps 1340-1355) and the AMVP mode (steps 1365-1380). In the exemplary process 1300 of FIG. 13, for the FRUC merge mode and the AMVP mode, the rate distortion search includes a loop over all coding parameters, including the IC flag. Therefore, in the existing process 1300, the possible value for each IC flag is being evaluated from the rate distortion viewpoint for the current CU, both in FRUC merge mode and the inter coded AMVP mode. Note EMT in step 1325 refers to Enhanced Multiple Transform.

Figure 14:
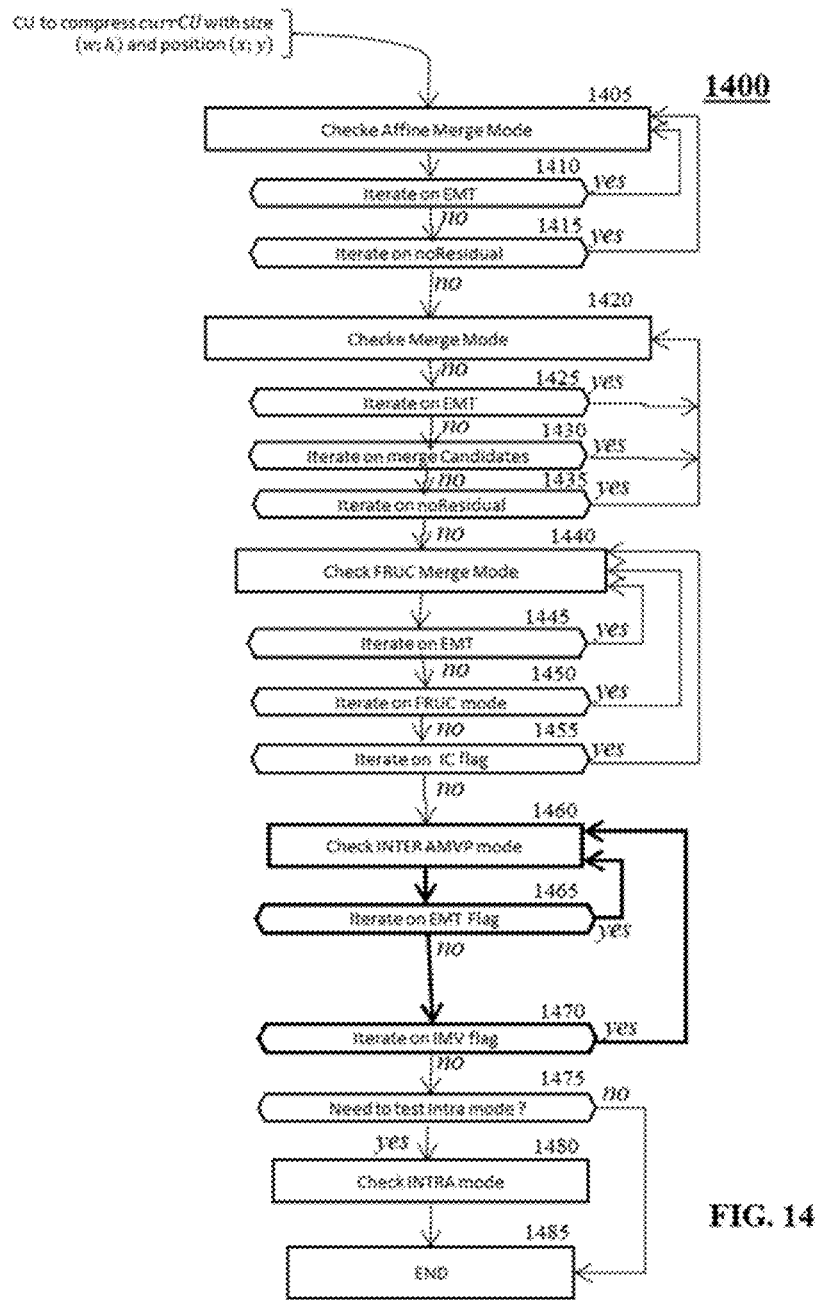
FIG. 14 illustrates an exemplary rate distortion optimization process, according to an aspect of the present embodiments.

FIG. 14 illustrates how the existing rate distortion optimization process 1300 may be modified according to an exemplary aspect of the present embodiments, with regards to the AMVP mode. As evident by the exemplary process 1400 of FIG. 14, the overall loop over each IC flag value is removed from the existing process 1300 in FIG. 13. Instead, the iterative search for the best IC configuration for an inter coded mode is moved to the motion search process, as described previously in connection with the exemplary process 1100 of FIG. 11 and to be described later in connection with the exemplary process 1600 shown in FIG. 16.

Figure 15:
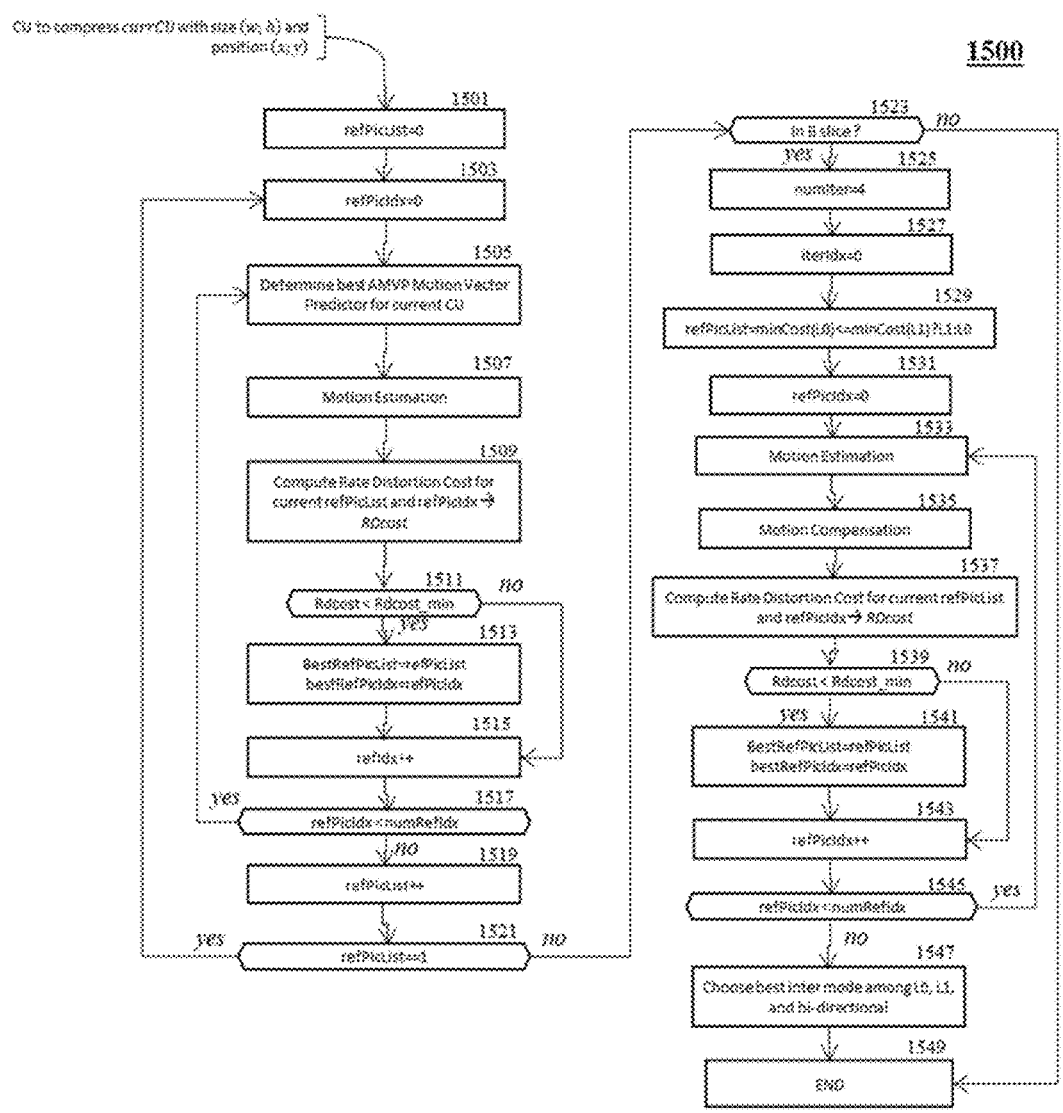
FIG. 15 illustrates an exemplary process for searching an AMVP coding mode.

FIG. 15 illustrates an exemplary existing process 1500 used by an encoder to search for the best AMVP coding mode. This process 1500 thus aims at finding the rate distortion optimal motion data to predict the considered CU. The process 1500 is made of 2 stages. The first stage at steps 1501-1521 of FIG. 15 determines the best motion data to predict the current CU, respectively for each reference picture list L0 and L1. Next, the second stage at steps 1523-1547 of FIG. 15, determines the best inter prediction mode among the two best found uni-directional prediction modes previously found, and the bi-directional temporal prediction of the current CU. Basically, the first stage involves a loop over each reference picture index for each reference picture list. For each candidate reference picture, the best motion vector predictor and the associated motion vector difference are searched. This implies the selection of the best motion vector prediction (MVP), and a motion estimation step based on this selected MVP. The second stage then performs an iterative search for the best bi-directional prediction of the CU. To do so, each iteration performs the motion estimation and compensation steps for one of the two reference lists in a way that minimizes the rate distortion cost of the bi-directional prediction of current CU.

Figure 16:
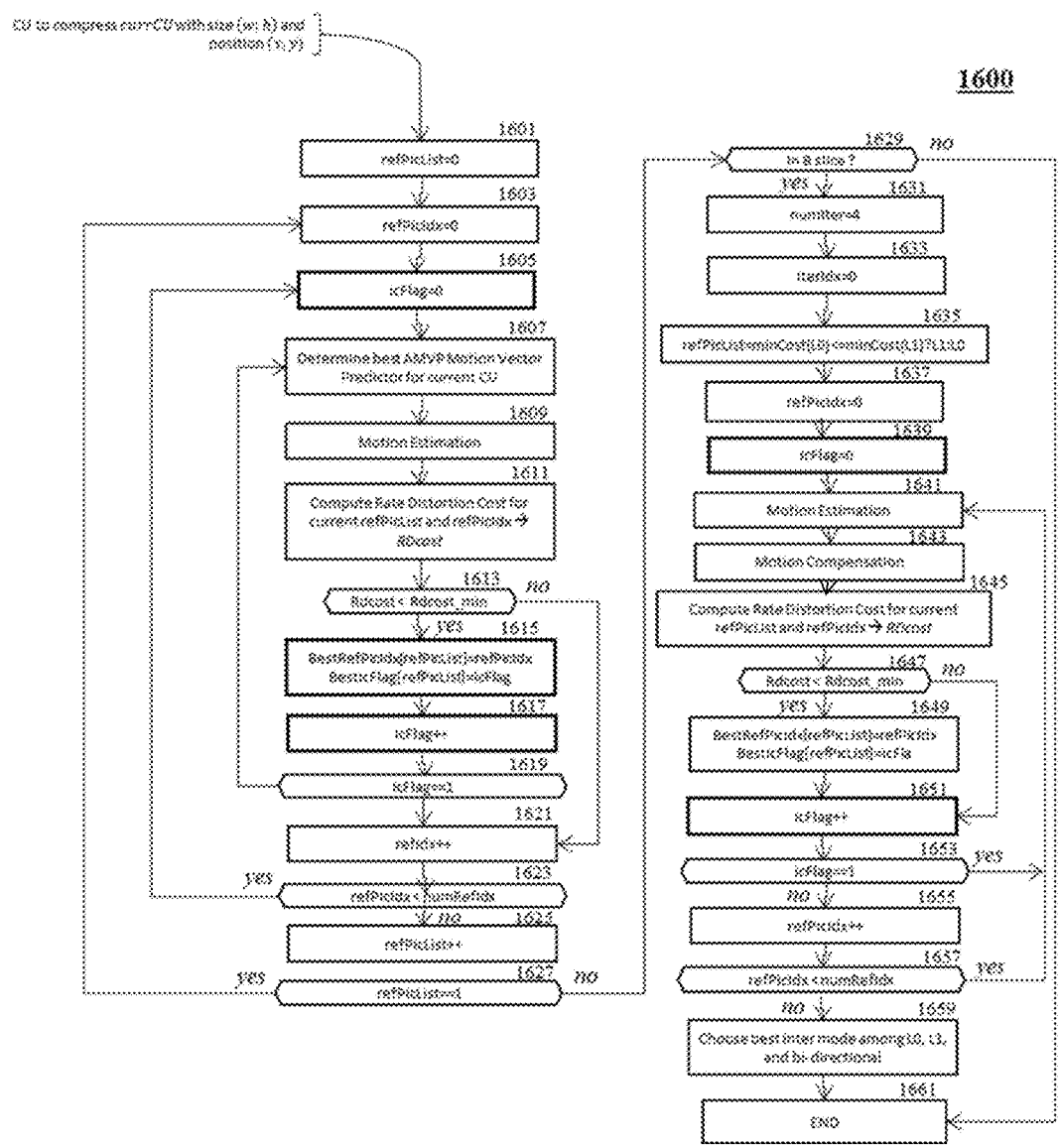
FIG. 16 illustrates an exemplary process for searching an AMVP coding mode, according to an aspect of the present embodiments.

FIG. 16 illustrates how the existing process 1500 used by an encoder to search for the best AMVP coding mode may be modified according to an exemplary aspect of the present embodiments. As can be seen, the search for the best motion information associated with each reference picture list now includes an additional loop over all possible IC flag values at steps 1605-1619 of FIG. 16, for the considered reference picture list. In addition, during the bi-directional motion search process, the refinement of the motion field for a reference picture also includes a loop over IC flag values at steps 1639-1657 in order to find the best IC flag configuration for the concerned list, when bi-directionally predicting the considered CU. Note that in the proposed codec modification as shown in FIG. 16, the motion compensation step now includes the application of potentially two different IC flags, respectively for the L0 and L1 reference picture list.

In addition, according to an exemplary embodiment, the two IC flags associated with a motion field of a CU in a B slice may be entropy coded using CABAC coding of these two IC flags successively. According to another non-limiting embodiment, the coding of the two above IC flags consists in coding the first flag, and then coding the second flag indicating if the second IC flag is equal to the first IC flag. The advantage of this last embodiment is an improved coding efficiency in the entropy coding of the IC flag information. Because the probability of the two flags being equal is higher than these two flags being different, coding information indicating whether these two flags are different or not can be more efficient than coding the flag directly. Different CABAC contexts can be associated with different flags.

Table 1 illustrates the value of the first flag, the value to be decoded for the first flag (same as the first flag value), the value of the second flag, the value to be decoded for the second flag (indicating whether the first and second flags are different, 1: same, 0: different).

TABLE 1

| First IC flag value (for List 0) | Bin for first IC flag | Second IC flag (for List 1) | Bin for second IC flag |
| --- | --- | --- | --- |
| 0 | 0 | 0 | 1 |
| 0 | 0 | 1 | 0 |
| 1 | 1 | 0 | 0 |
| 1 | 1 | 1 | 1 |

According to a further exemplary embodiment, when the motion vector of the current CU is derived or predicted from neighboring CUs, for example, using AMVP, the pair of IC flags are context coded according to the pair of IC flags associated with the CU that contains the selected MV predictor for the current CU.

In one example, whether the IC flag for List N of the current CU is equal to the IC flag for list N of the neighboring CU associated with the selected the motion vector predictor is encoded or decoded. When they are equal, a bin of "1" is encoded, otherwise "0" is encoded, as shown in Table 2.

TABLE 2

| IC flag for List N | IC flag for predictor for List N | Bin |
| --- | --- | --- |
| 0 | 0 | 1 |
| 0 | 1 | 0 |
| 1 | 0 | 0 |
| 1 | 1 | 1 |

The binarization as shown in Table 2 can also be used when only one IC flag is coded for a CU. In one example, if the two MVPs are equal to 0, then the CU level IC flag is predicted to be 0. If at least one of the two MVPs is equal to 1, then the CU level IC flag is predicted to be 1. Then the IC flag for the current CU is compared with the predicted IC flag. The bin is set to 1 if they are equal, and 0 if not. An example is shown in Table 3.

TABLE 3

| IC flag for current Coding Unit | IC flag for predictor for List 0 | IC flag for predictor for List 1 | Predicted IC flag | Bin |
| --- | --- | --- | --- | --- |
| 0 | 0 | 0 | 0 | 1 |
| 0 | 0 | 1 | 1 | 0 |
| 0 | 1 | 0 | 1 | 0 |
| 0 | 1 | 1 | 1 | 0 |
| 1 | 0 | 0 | 0 | 0 |
| 1 | 0 | 1 | 1 | 1 |
| 1 | 1 | 0 | 1 | 1 |
| 1 | 1 | 1 | 1 | 1 |

According to another embodiment, illumination compensation flag is not coded or decoded if illumination compensation is not used.

According to another embodiment, two IC flags are associated with a CU, respectively in the L0 and L1 motion fields as described above. However, when coding the IC flag information, only one IC flag is signaled for the AMVP CUs, which imposes that in the AMVP mode, the IC flags associated with each reference picture list are equal. Therefore, only one IC flag is needed. According to a further embodiment, if mvd_l1_zero_flag is equal to 1 (i.e., the motion vector difference is 0 for list 1), IC flag is inferred to be the IC flag associated with the CU that contains the selected MV predictor for the current AMVP CU, or the IC flag is inferred to be the IC flag coded for reference picture list 0.

According to another aspect of the present embodiment, the IC flags contained in the motion fields of the merge candidate CU are being propagated to the current CU predicted in the merge mode. This means that the CU in the merge mode is also assigned one IC flag in each of its motion fields. Therefore, a pair of IC flags are associated with the merge CU, through spatial propagation from neighboring causal CUs. The motion compensated temporal prediction of such merge CU thus includes the application of illumination change compensation, exactly the same way as for an AMVP CU. Therefore, advantages resulting from the present embodiments in the merge mode include that even for merge CUs, a differentiated illumination change compensation process (i.e., illumination compensation can be used for one list but not for the other one) may be applied for each reference picture list, similarly to that for AMVP CUs.

In another embodiment, IC flag may be predicted from the IC parameters. If IC parameters do not change the illumination (namely, Y=a*X+b with a=1 and b=0), the prediction for IC flag is 0. Otherwise the IC flag is predicted to 1. Then the difference between the predicted IC flag and the actually chosen IC flag can be encoded. This embodiment may improve the compression performance.

Exemplary modifications to the existing proposed syntax for the IC processing of a PU, according to an aspect of the present embodiments are shown in TABLE 4, with strike-through being used for the deletion and underlining being used for the additions to the existing syntax. The changes can also be applied to a CU where a CU is also a PU. The semantics of the removed or added syntax elements are described below.

ic_flag[x0][y0] specifies whether the inter prediction for all lists for the current prediction unit uses illumination compensation. The array indices x0, y0 specify the location (x0, y0) of the top-left luma sample of the considered prediction block relative to the top-left luma sample of the picture. This syntax element is removed.

ic_l0_flag[x0][y0] specifies whether the inter prediction for list 0 for the current prediction unit uses ilumination compensation. The array indices x0, y0 specify the location (x0, y0) of the top-left luma sample of the considered prediction block relative to the top-left luma sample of the picture. This syntax element is added.

ic_l1_flag[x0][y0] has the same semantics as ic_l0_flag, with l0 and list 0 replaced by l1 and list 1, respectively. This syntax element is added.

TABLE 4

|  | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if(nPbW * nPbH >= 64) { | |
|         affine_flag[ x0 ][ y0 ] | |
|       } | |
|       if( MaxNumMergeCand > 1 ) | |
|         merge_idx[ x0 ][ y0 ] | ae(v) |
|     } else { | |
|       if(nPbW > 8 && nPbH > 8) { | |
|         affine_flag[ x0 ][ y0 ] | ae(v) |
|       } | |
|       if(affine_flag[ x0 ][ y0 ]) { | |
|         ~~ic_flag[ x0 ][ y0 ]~~ | |
|       } | |
|       if( slice_type = = B ) | |
|         inter_pred_idc[ x0 ][ y0 ] | ae(v) |
|       if( inter_pred_idc[ x0 ][y0 ] != PRED L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|         <u>ic_l0_flag[ x0 ][ y0 ]</u> | ae(v) |
|       } | |
|       if( inter_pred_idc[ x0 ][y0 ] != PRED_L0 ) { | |
|         if( num_ref_idx_l1_active_minus_1 > 0 ) | |
|           ref_idx_l1[x0][y0] | ae(v) |
|         if( mvd_l1_zero_flag && inter_pred_idc[x0 ][y0 ] == PRED_BI ) { | |
|           MvdL1[ x0 ][y0 ][ 0 ] = 0 | |
|           MvdL1[ x0 ][y0 ][ 1 ] = 0 | |
|         } else | |
|           mvd_coding( x0, y0, 1 ) | |
|         mvp_l1_flag[ x0 ][ y0 ] | ae(v) |

TABLE 4-continued

| | Descriptor |
|---|---|
| ic_l1_flag[ x0 ][ y0 ]<br>}<br>}<br>}<br>} | ae(v) |

Various methods are described above, and each of the methods comprises one or more steps or actions for achieving the described method. Unless a specific order of steps or actions is required for proper operation of the method, the order and/or use of specific steps and/or actions may be modified or combined. In addition, some steps or actions may be removed.

Various numeric values are used in the present application, for example, the number of IC parameters, or the number of iterations in step 1525 in FIG. 15. It should be noted that the specific values are for exemplary purposes and the present embodiments are not limited to these specific values.

Various methods of improving IC processing according to the present embodiments as described above can be used to modify the motion estimation modules, motion compensation modules, and entropy coding and decoding modules (145, 170, 175, 330, 375) of the JVET or HEVC encoder and decoder as shown in FIG. 1 and FIG. 3. Moreover, the present embodiments are not limited to JVET or HEVC, and can be applied to other standards, recommendations, and extensions thereof. Various embodiments described above can be used individually or in combination.

In addition, in different embodiments, the IC model may use other linear or non-linear functions of the IC parameters. For example, the IC model may only consider the slope parameter without the intercept parameter, i.e. IC(y)=a*y. In another example, the IC model may have more than two parameters, depending on the function (e.g., depending on the degree of a polynomial function). To estimate the IC parameters, instead of the MSE as shown in Eq. (2), an absolute difference or other difference functions can be used. The present embodiments can also be applied when illumination compensation is used for intra coding.

Figure 17:
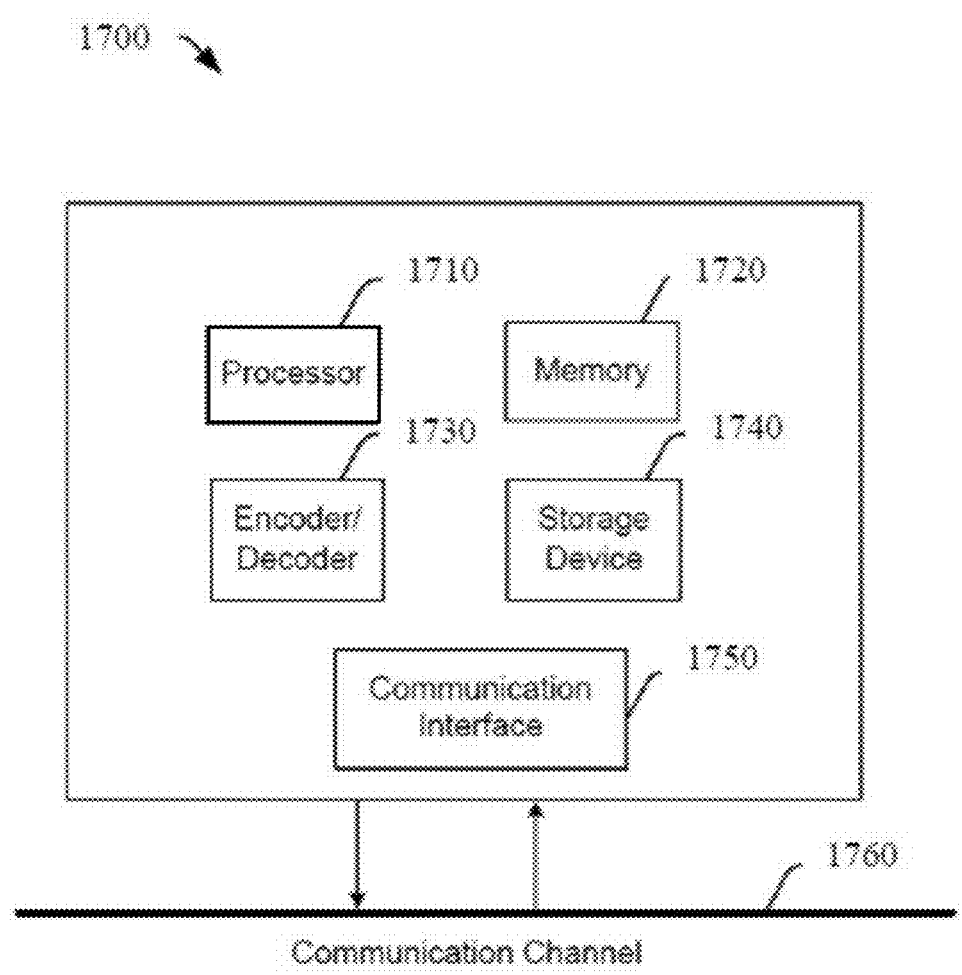
FIG. 17 illustrates a block diagram of a system within which aspects of the present embodiments can be implemented.

FIG. 17 illustrates a block diagram of an exemplary system 1700 in which various aspects of the exemplary embodiments may be implemented. The system 1700 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 1700 may be communicatively coupled to other similar systems, and to a display via a communication channel as shown in FIG. 17 and as known by those skilled in the art to implement all or part of the exemplary video systems described above.

Various embodiments of the system 1700 include at least one processor 1710 configured to execute instructions loaded therein for implementing the various processes as discussed above. The processor 1710 may include embedded memory, input output interface, and various other circuitries as known in the art. The system 1700 may also include at least one memory 1720 (e.g., a volatile memory device, a non-volatile memory device). The system 1700 may additionally include a storage device 1740, which may include non-volatile memory, including, but not limited to, EEPROM, ROM, PROM, RAM, DRAM, SRAM, flash, magnetic disk drive, and/or optical disk drive. The storage device 1740 may comprise an internal storage device, an attached storage device, and/or a network accessible storage device, as non-limiting examples. The system 1700 may also include an encoder/decoder module 1730 configured to process data to provide encoded video and/or decoded video, and the encoder/decoder module 1730 may include its own processor and memory.

The encoder/decoder module 1730 represents the module(s) that may be included in a device to perform the encoding and/or decoding functions. As is known, such a device may include one or both of the encoding and decoding modules. Additionally, the encoder/decoder module 1730 may be implemented as a separate element of the system 1700 or may be incorporated within one or more processors 1710 as a combination of hardware and software as known to those skilled in the art.

Program code to be loaded onto one or more processors 1710 to perform the various processes described hereinabove may be stored in the storage device 1740 and subsequently loaded onto the memory 1720 for execution by the processors 1710. In accordance with the exemplary embodiments, one or more of the processor(s) 1710, the memory 1720, the storage device 1740, and the encoder/decoder module 1730 may store one or more of the various items during the performance of the processes discussed herein above, including, but not limited to the input video, the decoded video, the bitstream, equations, formulas, matrices, variables, operations, and operational logic.

The system 1700 may also include a communication interface 1750 that enables communication with other devices via a communication channel 1760. The communication interface 1750 may include, but is not limited to a transceiver configured to transmit and receive data from the communication channel 1760. The communication interface 1750 may include, but is not limited to, a modem or network card and the communication channel 1750 may be implemented within a wired and/or wireless medium. The various components of the system 1700 may be connected or communicatively coupled together (not shown in FIG. 17) using various suitable connections, including, but not limited to internal buses, wires, and printed circuit boards.

The exemplary embodiments may be carried out by computer software implemented by the processor 1710 or by hardware, or by a combination of hardware and software. As a non-limiting example, the exemplary embodiments may be implemented by one or more integrated circuits. The memory 1720 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1710 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving to the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. An apparatus for decoding video data, comprising at least a memory and one or more processors, wherein said one or more processors are configured to:
   determine first and second motion vectors for a bi-predicted block being decoded in a picture;
   obtain first and second prediction blocks for said bi-predicted block, based on said first and second motion vectors, respectively;
   determine a first illumination compensation flag and a second illumination compensation flag, indicating use of a first set of illumination compensation parameters and a second set of illumination compensation parameters for decoding said bi-predicted block, for first and second motion vectors, respectively, wherein said first illumination compensation flag is determined based on said second illumination compensation flag, and wherein said first illumination compensation flag is entropy decoded using a different CABAC (Context-Adaptive Binary Arithmetic Coding) context than said second illumination compensation flag;
   determine said first set and said second set of illumination compensation parameters;
   adjust said first prediction block using said first set of illumination compensation parameters and adjust said second prediction block using said second set of illumination compensation parameters; and
   decode said bi-predicted block responsive to an average of said adjusted first prediction block and said adjusted second prediction block.

2. The apparatus of claim 1, wherein said first illumination compensation flag is decoded based on whether said first and second illumination compensation flags are different.

3. The apparatus of claim 1, wherein a motion vector, associated with reference picture list N, N=0, 1, of said bi-predicted block is decoded based on a motion vector predictor of a neighboring block, and wherein an IC flag for said list N of said block is decoded based on an IC flag for list N of said neighboring block.

4. The apparatus of claim 3, wherein said IC flag for said list N of said block is decoded based on whether said IC flag for said list N of said block is equal to said IC flag for list N of said neighboring block.

5. A method for decoding video data, comprising:
   determining first and second motion vectors for a bi-predicted block being decoded in a picture;
   obtaining first and second prediction blocks for said bi-predicted block, based on said first and second motion vectors, respectively;
   determining a first illumination compensation flag and a second illumination compensation flag, indicating use of a first set of illumination compensation parameters and a second set of illumination compensation parameters for decoding said bi-predicted block, for first and second motion vectors, respectively, wherein said first illumination compensation flag is determined based on said second illumination compensation flag, and wherein said first illumination compensation flag is entropy decoded using a different CABAC (Context-Adaptive Binary Arithmetic Coding) context than said second illumination compensation flag;

determining said first and second set of illumination compensation parameters;

adjusting said first prediction block using said first set of illumination compensation parameters and adjust said second prediction block using said second set of illumination compensation parameters; and decoding said bi-predicted block responsive to an average of said adjusted first prediction block and said adjusted second prediction block.

6. The method of claim 5, wherein said first illumination compensation flag is decoded based on whether said first and second illumination compensation flags are different.

7. The method of claim 5, wherein a motion vector associated with reference picture list N, N=0, 1, of said bi-predicted block is decoded based on a motion vector predictor of a neighboring block, and wherein an IC flag for said list N of said block is decoded based on an IC flag for list N of said neighboring block.

8. The method of claim 7, wherein said IC flag for said list N of said block is decoded based on whether said IC flag for said list N of said block is equal to said IC flag for list N of said neighboring block.

9. A method for encoding video data, comprising:

determining first and second motion vectors for a bi-predicted block being encoded in a picture;

obtaining first and second prediction blocks for said bi-predicted block, based on said first and second motion vectors, respectively;

determining a first set and a second set of illumination compensation parameters for said first and second motion vectors, respectively, wherein a first illumination compensation flag and a second illumination compensation flag, indicating use of said first and second sets of illumination compensation parameters for encoding said bi-predicted block, is provided for first and second motion vectors, respectively;

encoding said first illumination compensation flag based on said second illumination compensation flag, wherein said first illumination compensation flag is entropy encoded using a different CABAC (Context-Adaptive Binary Arithmetic Coding) context than said second illumination compensation flag;

adjusting said first prediction block using said first set of illumination compensation parameters and adjusting said second prediction block using said second set of illumination compensation parameters; and encoding said bi-predicted block responsive to an average of said adjusted first prediction block and said adjusted second prediction block.

10. The method of claim 9, wherein said first illumination compensation flag is encoded based on whether said first and second illumination compensation flags are different.

11. The method of claim 9, wherein a motion vector associated with reference picture list N, N=0, 1, of said bi-predicted block is encoded based on a motion vector predictor of a neighboring block, and wherein an IC flag for said list N of said block is encoded based on an IC flag for list N of said neighboring block.

12. The method of claim 11, wherein said IC flag for said list N of said block is encoded based on whether said IC flag for said list N of said block is equal to said IC flag for list N of said neighboring block.

13. An apparatus for encoding video data, comprising at least a memory and one or more processors, wherein said one or more processors are configured to:

determine first and second motion vectors for a bi-predicted block being encoded in a picture;

obtain first and second prediction blocks for said bi-predicted block, based on said first and second motion vectors, respectively;

determine a first set and a second set of illumination compensation parameters for said first and second motion vectors, respectively, wherein a first illumination compensation flag and a second illumination compensation flag, indicating use of said first and second sets of illumination compensation parameters for encoding said bi-predicted block, is provided for first and second motion vectors, respectively;

encode said first illumination compensation flag based on said second illumination compensation flag, wherein said first illumination compensation flag is entropy encoded using a different CABAC (Context-Adaptive Binary Arithmetic Coding) context than said second illumination compensation flag;

adjust said first prediction block using said first set of illumination compensation parameters and adjust said second prediction block using said second set of illumination compensation parameters; and encode said bi-predicted block responsive to an average of said adjusted first prediction block and said adjusted second prediction block.

14. The apparatus of claim 13, wherein said first illumination compensation flag is encoded based on whether said first and second illumination compensation flags are different.

15. The apparatus of claim 13, wherein a motion vector associated with reference picture list N, N=0, 1, of said bi-predicted block is encoded based on a motion vector predictor of a neighboring block, and wherein an IC flag for said list N of said block is encoded based on an IC flag for list N of said neighboring block.

16. The method of claim 15, wherein said IC flag for said list N of said block is encoded based on whether said IC flag for said list N of said block is equal to said IC flag for list N of said neighboring block.

* * * * *